United States Patent [19]
Goto et al.

[11] Patent Number: 5,121,733
[45] Date of Patent: Jun. 16, 1992

[54] AIR INTAKE SYSTEM FOR SUPERCHARGED ENGINE

[75] Inventors: Tsuyoshi Goto; Kouichi Hatamura; Toshikazu Kurokawa, all of Hiroshima, Japan

[73] Assignee: Mazda Motor Corporation, Hiroshima, Japan

[21] Appl. No.: 602,143

[22] Filed: Oct. 24, 1990

[30] Foreign Application Priority Data

Oct. 24, 1989 [JP] Japan .................................. 1-278232

[51] Int. Cl.⁵ .............................................. F02B 33/44
[52] U.S. Cl. ................................................. 123/559.1
[58] Field of Search ...................................... 123/559.1

[56] References Cited

U.S. PATENT DOCUMENTS

| | | | |
|---|---|---|---|
| 2,844,133 | 7/1958 | Thompson | 123/559.1 |
| 2,873,574 | 2/1959 | Webb | 123/559.1 |
| 3,796,048 | 3/1974 | Annus et al. | 60/605.1 |
| 4,958,606 | 9/1990 | Hitomi et al. | 123/559.1 |
| 5,033,268 | 7/1991 | Hitomi et al. | 60/605.1 |

*Primary Examiner*—Richard A. Bertsch
*Assistant Examiner*—Charles G. Freay
*Attorney, Agent, or Firm*—Fish & Richardson

[57] ABSTRACT

An air intake system for a supercharged automotive engine has an independent air intake passage an end of which is communicated independently and separately with a combustion chamber of each cylinder and a supercharger for supercharging intake air. The air intake valve closing timing is delayed after bottom dead point and the independent air intake passage is shaped so that the number of revolutions which causes maximum inertia in the independent air intake passage by supercharging in a high-speed region is higher than the number of revolutions of the engine at which maximum horse power is generated.

20 Claims, 6 Drawing Sheets

AIR INTAKE SYSTEM FOR SUPERCHARGED ENGINE

BACKGROUND OF THE INVENTION

1. Field of the Invention

The present invention relates to an air intake system for a supercharged engine.

2. Description of the Related Art

Heretofore, various engines of a type capable of supercharging intake air by superchargers in order to increase the quantity of the intake air for the engine are known to those skilled in the art, as disclosed for example in Japanese Utility Model Unexamined Publication (kokai) No. 171,630/1981. Further, there are known a turbo supercharger of a type driven by exhaust gases and a mechanical supercharger of a type driven by an output shaft of the engine.

Conventional supercharged engines are so set as to have a geometric compression ratio of the engine at a relatively low value of less than 8.5 because knocking is likely to occur in a highly supercharged region if the geometric compression ratio is enlarged. However, if the geometric compression ratio of the engine is lowered, there may arise the tendency that cycle efficiency of the engine is reduced. Further, for a supercharged engine, it is required to insure reliability of an exhaust system in a highly supercharged region by suppressing the rise of the temperature of exhaust gases. At this end, such conventional supercharged engines are so designed as to reduce the temperature of the exhaust gases by making the air/fuel ratio lean to a rich range in a high-speed, high-load operation by cooling fuel; however, this requires more fuel than the quantity of fuel required for output.

Under those circumstances as described hereinabove, conventional supercharged engines cannot be said to improve mileage, particularly so in a high-speed, high-load region, so that an improvement in this point has been demanded.

A copending Japanese patent application (Japanese Patent Unexamined Publication (kokai) No. 239,312/1985) proposes a system in which the geometric compression ratio is set to be greater than conventional supercharged engines and the intake valve closing timing is delayed as compared with those conventional supercharged engines, thereby suppressing the effective compression ratio to an appropriate level while gaining the expansion ratio and as a consequence maintaining anti-knock performance to an appropriate level. This proposed system can also prevent the excessive rise of the temperature of exhaust gases without relying upon leaning the air-fuel ratio to a rich region, thereby improving reliability of the engine and fuel economy and further achieving an improvement in fuel economy due to a decrease in a loss in pumping in a low-load or middle-load region.

For such supercharged engines so designed as to delay the intake valve closing timing, the pressure within the air intake passage on the exhaust side of the supercharger rises due to the delayed closing of the intake valve, so that the engine with the mechanical supercharger has the tendency that a loss of power for driving the supercharger is increased and the volume efficiency of the supercharger is decreased. On the other hand, the engine with the turbo-charger has the tendency that the amount of air supercharged is reduced. For this reason, it is considered that such a shape of the independent air intake passage capable of achieving the inertia effect in an engine high-speed region, as widespread adopted by conventional ones so as to achieve high output is applied to the supercharged engine. Such a shape of the independent air intake passage is so arranged, for example, as to make a passage length thereof relatively longer by curving it or as to make a ratio of a transversely sectional area to the passage length thereof relatively larger. In this case, however, the pressure in the intake passage on the exhaust side of the supercharger is lowered due to the inertia effect in the engine high-speed region. For the engine with the mechanical supercharger, the loss in power for driving the supercharger is reduced because of a decrease in the back pressure of the supercharger, and a ratio of the air pressure on the intake side of the supercharger to the air pressure on the exhaust side thereof is reduced, thus leading to improving the volume efficiency for the supercharger. Further, for the engine with the turbocharger, the quantity of air supercharged under a constant supercharging pressure, i.e. under the condition, for example, where the pressure supercharged is adjusted to be constant by a waste valve, thereby enhancing high output of the engine.

The aforesaid arrangement, however, presents the new problems that high output of the engine cannot be attained as a matter of fact in the engine high-load region and fuel economy becomes poorer as well. More specifically, those problems arise in an engine high-load, high-speed region because the decrease in the output to be caused by the adiabatic compression action resulting from the inertia effect of intake air before the intake valve closing timing is larger than the loss of its power for driving the supercharger and the increase in the volume efficiency for the engine with the mechanical supercharger, on the one hand, and than the anticipated increment of the output due to the increase in the quantity of air supercharged for the engine with the turbocharger, on the other hand. Further, the new problem may occur due to the reduction of output and fuel economy due to retardation of the spark timing on the basis of the reduction of anti-knock performance resulting from the rise in the temperature within the cylinders, thereby consequently failing to gain the increase of the maximum power and rendering the fuel economy poorer.

SUMMARY OF THE INVENTION

Therefore, the present invention has the object to provide an air intake system for a supercharged engine which is so designed as to achieve high output (improvement in power) and better fuel economy by improving heat efficiency while taking advantage of the action due to the delayed closing of the intake valve.

In order achieve the aforesaid object, the present invention consists of an air intake system for a supercharged engine having an independent air intake passage an end of which is communicated independently and separately with a combustion chamber of each cylinder, comprising a supercharger for supercharging intake air;

wherein an air intake valve closing timing is so set as to become sufficiently delayed after bottom dead point; and the independent air intake passage is so set as to be in such a shape that the number of revolutions which synchronizes with inertia for supercharging which occurs in said independent air intake passage exists in a high-speed region higher than the number of revolutions of the engine at which a maximum horse power is generated.

With the aforementioned arrangement, the present invention can achieve better fuel economy due to the decrease in loss upon pumping by the delayed closing of the intake valve in a low-load or middle-load region, on the one hand, and can prevent the anti-knock performance from reducing and can carry out combustion at the optimum spark timing capable of achieving high torque of the engine by decreasing the adiabatic compression action due to no occurrence of the inertia action within the independent air intake passage and due to the suppression of the rise in the effective compression ratio because of the delayed closing of the intake valve, in a high-load region, particularly in a high engine-rotational region in which the intake air is likely to enter prior to the intake valve closing timing, on the other hand. Hence, both high output and better fuel economy can be achieved due to improvement in the heat efficiency in such a high-rotational region as producing the maximum horse power. As described hereinabove, the air intake system according to the present invention can improve output and mileage as well as the maximum power, while the reliability of the engine is insured.

Other objects, features and advantages of the present invention will become apparent from the reading of the description of the preferred embodiments, which follows, in conjunction with the accompanying drawings.

BRIEF DESCRIPTION OF THE DRAWINGS

FIGS. 4 and 5A are views showing the application of the present invention to the V-shaped, 6-cylinder engine: in which

DETAILED DESCRIPTION OF THE PREFERRED EMBODIMENTS

The present invention will be described in more detail in conjunction with the accompanying drawings.

Figure 1:
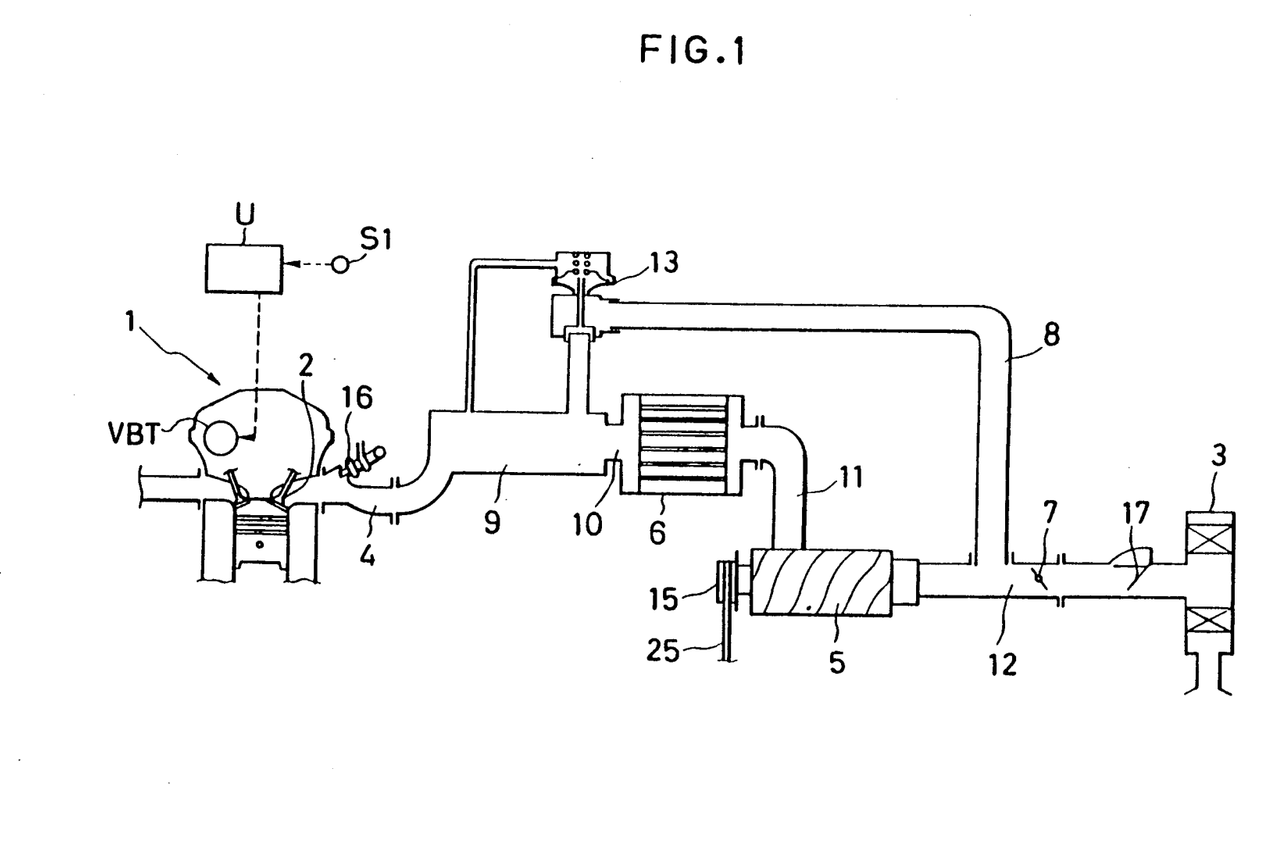
FIG. 1 is a diagrammatic representation of an outline of the air intake system according to an embodiment of the present invention.

As shown in FIG. 1, reference numeral 1 denotes the main body of an engine so set as to have a geometric compression ratio at a value of as high as approximately 10. Reference numeral 2 denotes an air intake valve which is so set as to have an intake valve opening timing, at which the air intake valve departs from a valve sheet, expressed by a crank angle at approximately 10 degrees before top (upper) dead point, and as to have an intake valve full closing timing, at which the air intake valve is seated on the valve sheet and fully closes an intake port, expressed by a crank angle at approximately 80 degrees after bottom (lower) dead point. It is to be noted herein that the intake valve closing timing defined at the time, at which the air intake valve is located in a position away from the valve sheet by the valve lift of 1 mm, i.e. at which the air intake valve closes the intake port to the valve lift of 1 mm, is so set as to have a crank angle at approximately 60 degrees after bottom dead point.

It is further to be noted herein that the difference between the intake valve full closing timing and the intake valve closing time defined in the position away by the valve lift of 1 mm may be expressed by a crank angle in the range from approximately 20 degrees plus or minus 5 degrees, although it may vary with engines to some extent.

As shown also in FIG. 1, reference numeral 4 generally denotes an independent air intake passage disposed at each cylinder independently and separately from each other. The independent air intake passage 4 is communicated at its downstream end with a combustion chamber of each of the cylinders and at its upstream end with a surge tank 9. The length of the passage ranging from the upstream end of the independent air intake passage 4 at which the independent air intake passage 4 is communicated with the surge tank 9 to the downstream end thereof at which the independent air intake passage 4 is communicated with the combustion chamber is set to be approximately 300 mm. In other words, for the engine in this embodiment, the number of revolutions of the engine (the number of maximum revolutions in a region of the number of revolutions in the normal operation) at which the maximum horse power is to be generated is set to approximately 6,000 rpm. The number of revolutions of the engine, Ne (expressed in rpm), which so synchronizes as to cause maximum inertia in the independent air intake passage 4, may be determined by the following formula (1):

$$Ne = \frac{60}{1.5} \times \frac{a}{2\pi} \sqrt{\frac{S}{V \times L}} \times \alpha \tag{1}$$

where
- B stands for the sonic speed propagating in the intake air (347 meters per second at 25° C.);
- S stands for a transversely sectional area of the independent air intake passage ($38^2 \times (\pi/4) \times 10^{-6}$ m$^2$ for the engine in this embodiment);
- V stands for a stroke volume ($400 \times 10^{-6}$ m$^3$ for the engine in this embodiment);
- L stands for the length of the independent air intake passage, expressed in meters;
- α stands for a correction coefficient (a coefficient to be determined by the air intake valve closing timing and the inertia characteristic number; approximately 0.87 to 0.94 at the air intake valve closing timing defined herein-above at 50 to 90 degrees after the bottom dead point).

As is understood from the aforesaid formula (1), the number of revolutions of the engine, Ne, depends mainly upon the length L of the independent air intake passage 4, because the S/V does not generally vary to a great extent.

Figure 2:
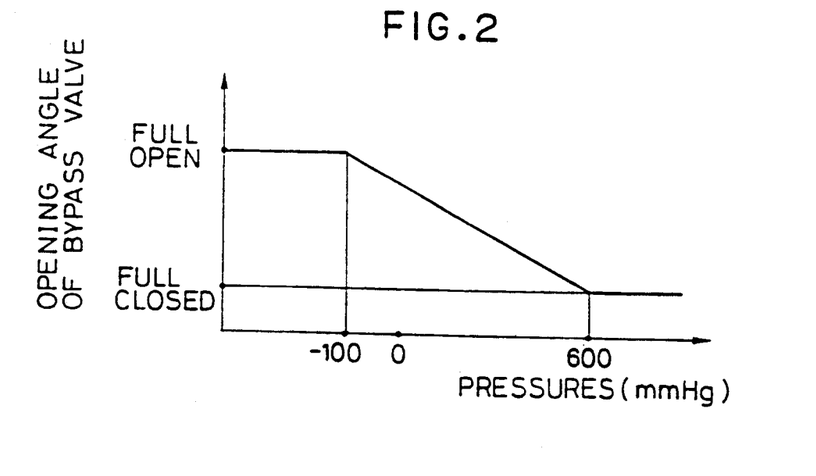
FIG. 2 is a graph showing the characteristic of a bypass valve.
Figure 3:
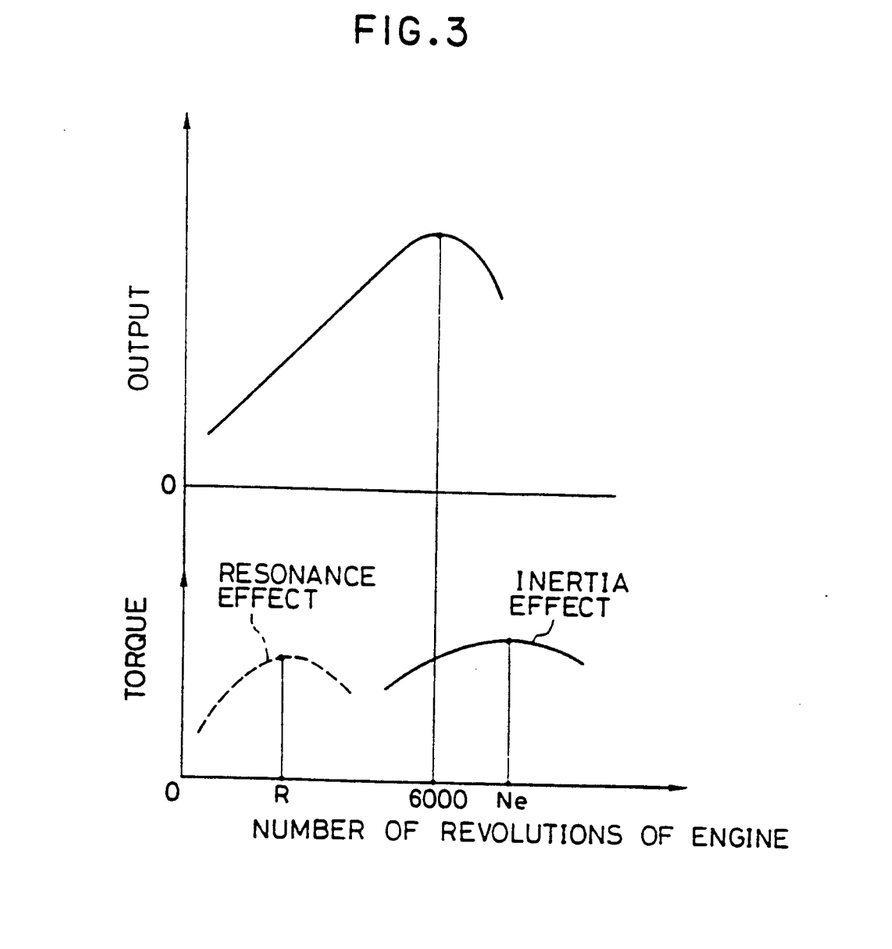
FIG. 3 is a graph showing the relationship between the number of rotations of the engine and the number of rotations thereof capable of attaining the maximum output (maximum horse power) and the synchronizing numbers of revolutions thereof for supercharging so as to cause inertia and for supercharging so as to cause resonance.

As shown further in FIG. 1, reference numeral 5 denotes a mechanical supercharger (hereinafter referred to merely as supercharger) driven by a crank shaft (not shown) through a pulley 15 and a driving belt 25, and the supercharger to be used in this embodiment is of a so-called screw type consisting of a pair of screw rotors. The supercharger 5 is communicated at its air intake side with an air cleaner 3 through an upstream common passage 12. An air flowmeter 17, a throttle valve 7, and the junction of a bypass passage 8 bypassing the supercharger 5 are disposed on the upstream common passage 12 in this order from the upstream side. Reference numeral 6 denotes an intercooler which in turn is communicated at its upstream side with an exhaust side of the supercharger 5 through a downstream common passage 11 and at its downstream side with the surge tank 9 through an upstream air intake passage 10. Reference numeral 13 denotes a bypass valve which in turn opens or closes the bypass passage 8 by the pressure within the surge tank 9 (the pressure for taking air in at the downstream side of the throttle valve 7) and, as shown in FIG. 2, the bypass valve 13 opens the bypass passage 8 by the negative pressure in a low-load region and closes gradually the bypass passage 8 as the rise in the engine load, leading to full closure of the bypass passage 8 in a high-load region. Reference numeral 16 denotes a fuel injector for injecting fuel disposed at the independent air intake passage 4.

Figure 4:
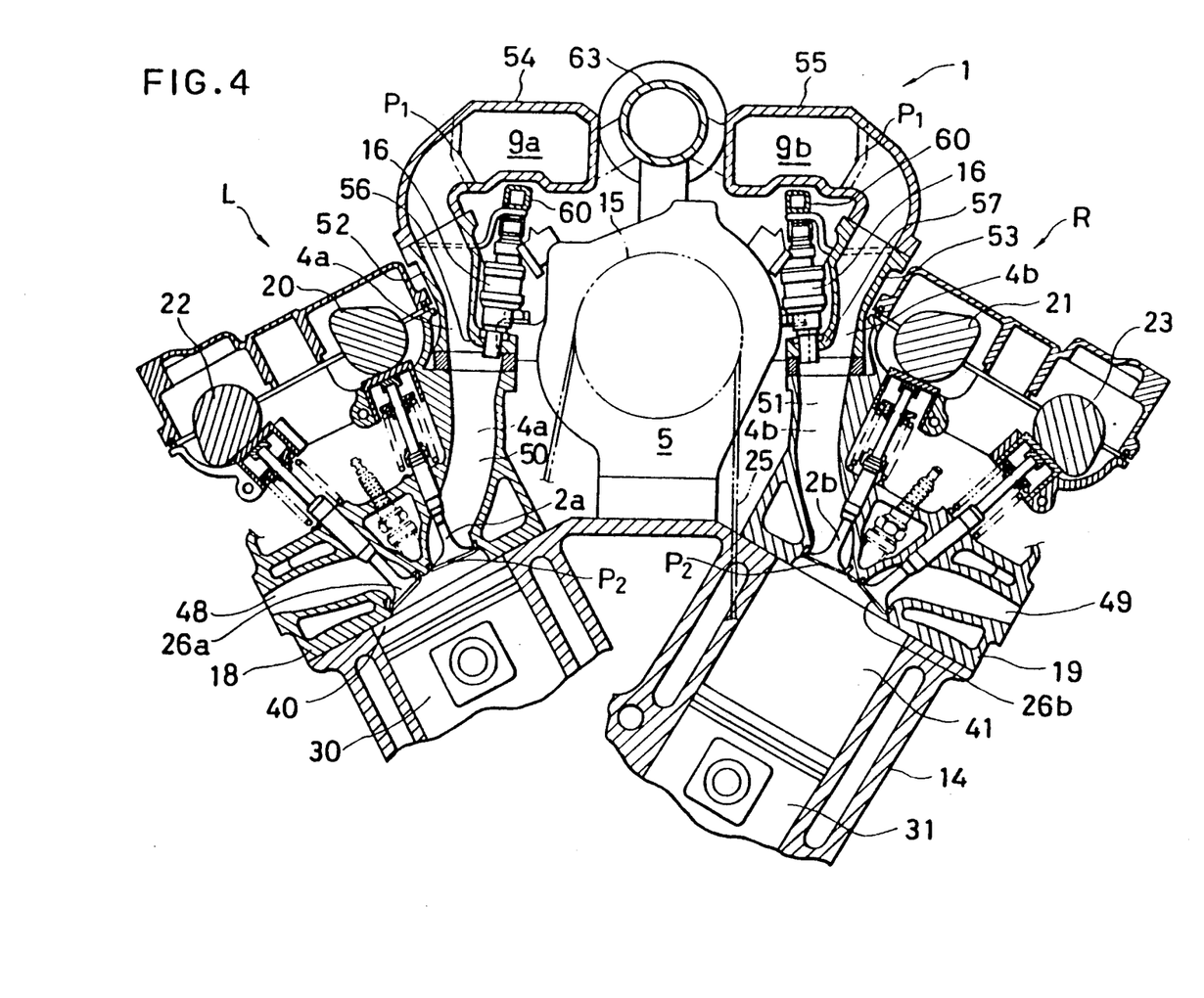
FIG. 4 is a sectional view when taken along the line X4—X4 of FIG. 5A
Figure 5A:
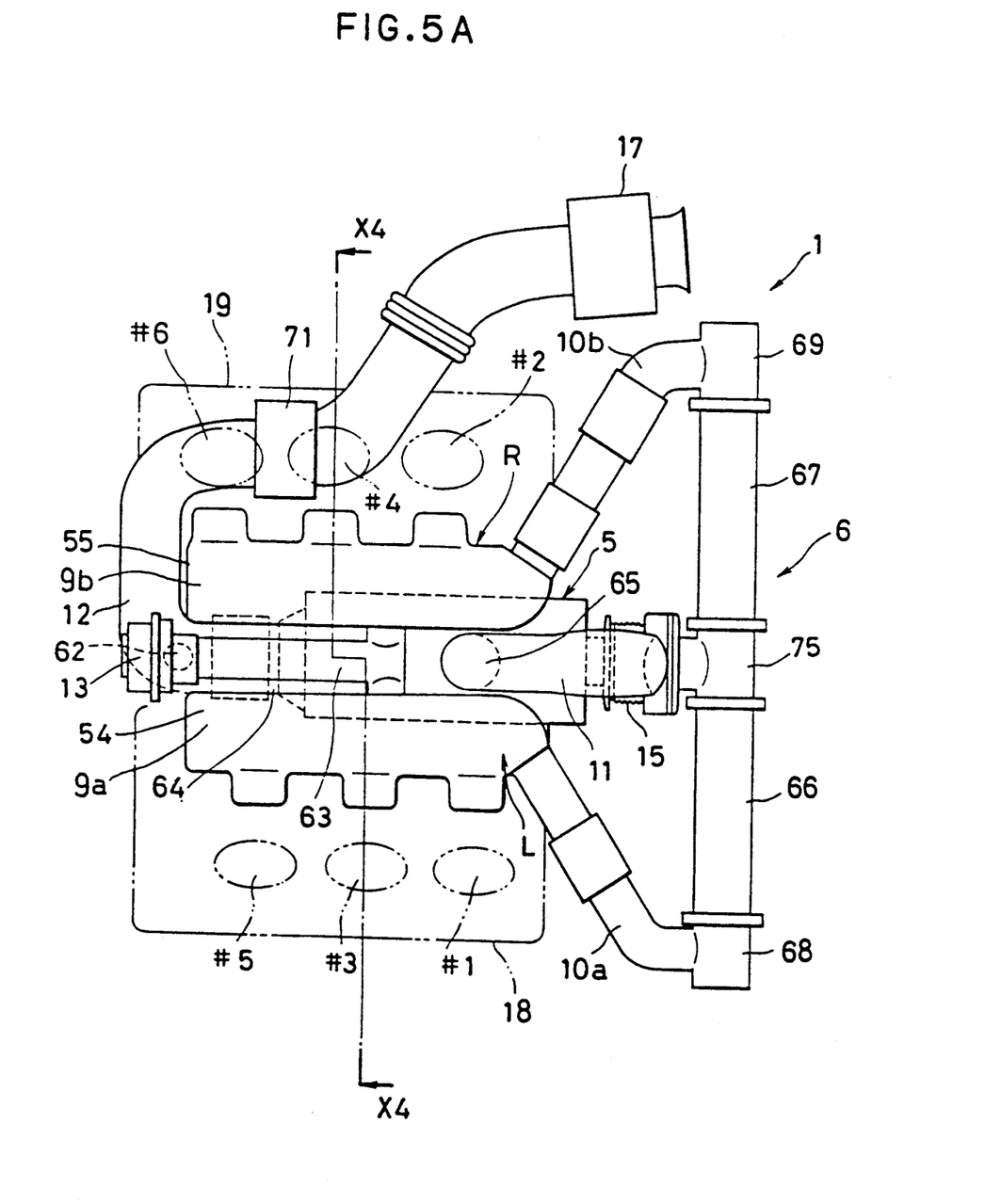
FIG. 5A is a plan view of FIG. 4.
Figure 5B:
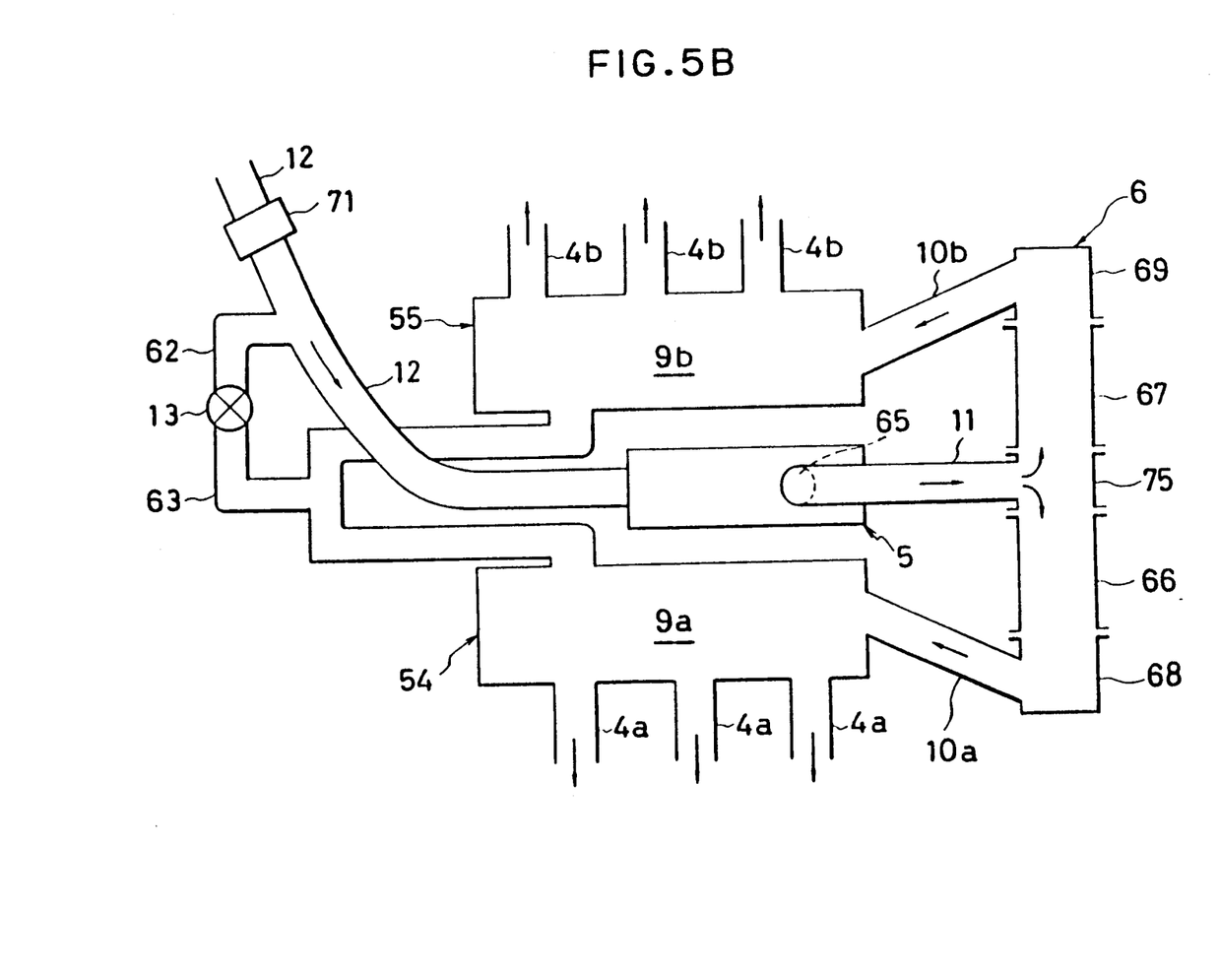
FIG. 5B is a diagrammatic representation of the air intake passage of FIG. 5A.

FIGS. 4, 5A and 5B illustrate the instance where the present invention is applied to a V-shaped 6-cylinder engine. It is to be noted herein that the same elements are provided with the same reference numerals as shown in FIG. 1, so that duplicate description thereon will be omitted herefrom for brevity of explanation.

Reference numeral 14 denotes a cylinder block comprising cylinders #1, #3 and #5 on the bank on the left side of the cylinder block 14 and cylinders #2, #4 and #6 on the bank on the right side thereof. Each of the left-hand cylinders #1, #3 and #5 is slidably provided with a piston generally indicated by reference numeral 30, while each of the right-hand cylinders #2, #4 and #6 is slidably provided with a piston generally indicated by reference numeral 31. A left-hand cylinder head 18 is connected to the left-hand side bank of the cylinder block 14 while a right-hand cylinder head 19 is connected to the right-hand side bank thereof. On the V-shaped inner side of each of the left-hand cylinder head 18 and the right-hand cylinder head 19 are disposed intake ports 50 and 51, respectively, which are communicated with combustion chambers 40 and 41 of the respective cylinders. On the V-shaped outer side of each of the left-hand cylinder head 18 and the right-hand cylinder head 19 are disposed exhaust ports 48 and 49. Reference numerals 20 and 21 denote cam shafts for driving intake valves 2a and 2b, respectively, and reference numerals 22 and 23 denote cam shafts for driving the exhaust valves 26a and 26b, respectively.

The cylinders #1, #3 and #5 on the left-hand side bank constitute a cylinder group in which they are disposed adjacent to each other and they are to be ignited in this order and, likewise, the cylinders #2, #4 and #6 on the right-hand side bank constitute another cylinder group in which they are disposed adjacent to each other and they are to be ignited in this order.

Between the V-shaped banks of the cylinder block 14, i.e. in a middle space between the left-hand and right-hand side banks thereof, is disposed the supercharger 5 of a screw type, and intake manifolds 54 and 55 for the left-hand and right-hand side banks thereof are so disposed, respectively, as to cover the supercharger 5. On the rear side in the axial direction of the supercharger 5 is formed an intake port 64 which is communicated with the upstream common passage 12. Upward of the supercharger 5 is formed an exhaust port 65 which is communicated with the downstream common passage 11.

Reference numeral 63 denotes an upstream bypass passage constituting the bypass passage 8, which is communicated with each of the surge tanks 9a and 9b disposed in the intake manifolds 54 and 55 on the left-hand and right-hand side banks of the cylinder block 14. On the other hand, reference numeral 62 denotes a downstream bypass passage constituting the bypass passage 8, which is communicated with the upstream air intake passage 12 located on the upstream side of the supercharger 5. At a junction of the upstream bypass passage 62 and the downstream bypass passage 63 is disposed the bypass valve 13. It is noted herein that the downstream bypass passage 63 is branched into two branch passages which are communicated with the left-hand and right-hand surge tanks 9a and 9b, respectively, as shown in FIG. 5B and that the left-hand surge tank 9a serves as a first volume enlarging portion where the volume is enlarged while the right-hand surge tank 9b as a second volume enlarging portion which the volume is enlarged.

Reference numerals 66 and 67 denote intercooler sections of the intercooler 6, which are integrally connected to each other through an inlet tank 75 which in turn is communicated with the exhaust port 65 of the supercharger through the downstream common passage 11. Reference numerals 68 and 69 denote outlet coolers for the respective intercooler sections 66 and 67, and the outlet cooler 68 is communicated with the left-hand surge tank 9a through the upstream air intake passage 10a while the outlet cooler 69 is communicated with the right-hand surge tank 9b through the upstream air intake passage 10b. This intercooler 6 serves as a common volume enlarging portion where the volume is enlarged, while the upstream air intake passages 10a and 10b serve as resonance passages, as will be described hereinafter.

As shown in FIG. 4, each of the independent air intake passages 4a and 4b on the left-hand and right-hand side banks of the cylinder block 14, respectively, is so disposed as to have a passage length between position P1 and position P2 which is set in this embodiment to approximately 300 mm, as have been described hereinabove, and as to be of a shape such that the number of revolutions which synchronizes to cause maximum inertia does not exist in the region in which the engine is rotated at the normal operation.

The passage length of each of the independent air intake passages 4a and 4b is so set as to satisfy the relationship as shown by the following formulas (2) and (3):

$$A = B^2 \times \pi/4 \left[ Z - \frac{Z}{2} \left\{ (1 - \cos y) + \frac{Z}{8l} (1 - \cos 2y) \right\} \right] \quad (2)$$

$$L = A/S \quad (3)$$

where
  L stands for the length of the independent air intake passage 4a or 4b, expressed in meters, as described herein;

S stands for the transversely sectional area of the independent air intake passage as described herein;

A stands for a back flow volume;

B stands for a diameter of a cylinder bore ($78 \times 10^{-3}$ cm in this embodiment);

Z stands for a piston stroke ($84 \times 10^{-3}$ m in this embodiment);

I stands for a length of the connecting rod y stands for a crank angle from the intake valve full closing timing to the top dead point (180 degrees to 80 degrees in this embodiment).

The passage length of the independent air intake passage 4a and 4b is determined by the aforesaid formulas (2) and (3) with the fact into consideration that intake air which has once been let in by the combustion chamber 40 or 41 is flown back into the surge tank 9a or 9b immediately before the closing of the air intake valve by the delay in closing of the air intake valve and the air-fuel ratio of the intake air deviates resulting in the lowering of air-fuel ratio thereof.

Figure 6:
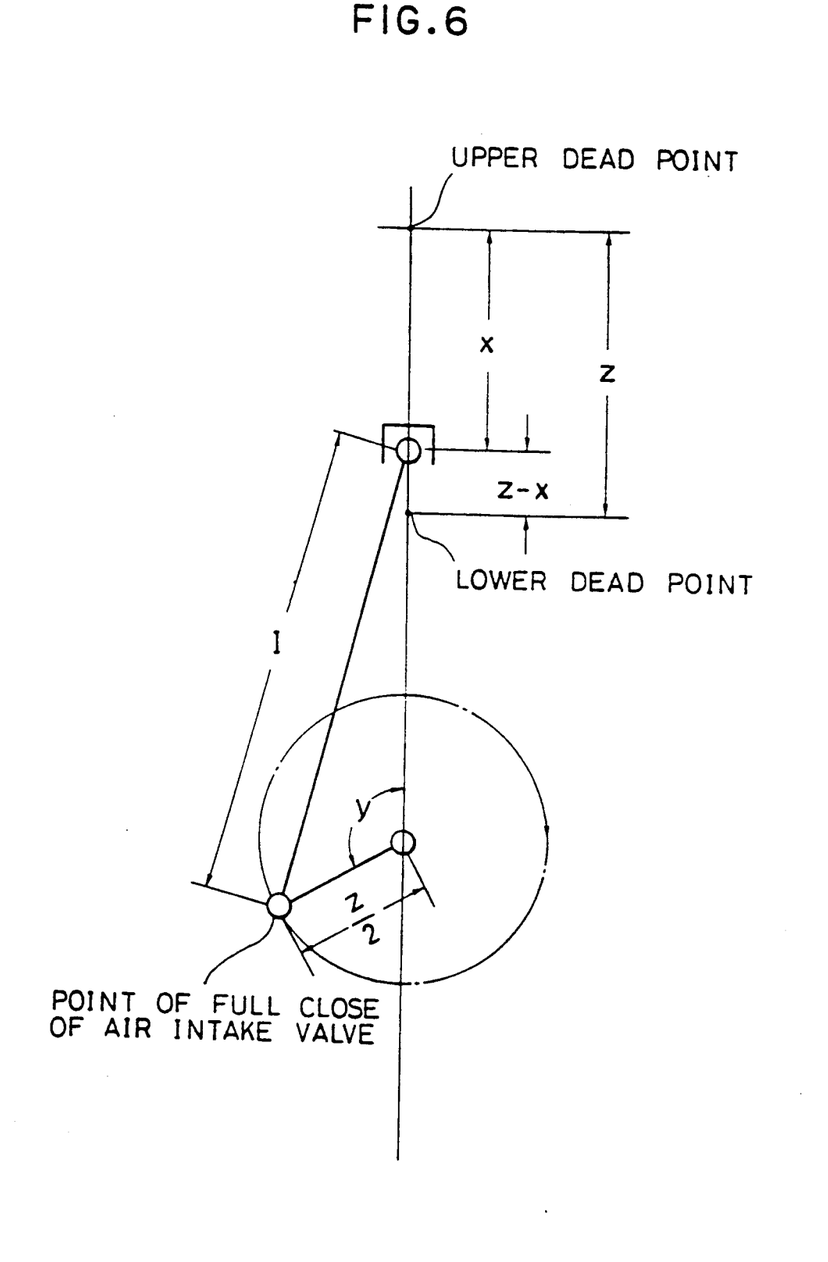
FIG. 6 is a diagrammatic representation for describing the way of preventing the back flow of the intake air.

Description will now be made on the prevention of intake air from flowing back with reference to FIG. 6. It is to be understood that the quantity of intake air flown back may be determined by the value obtained by multiplying the amount of displacement of the piston during which the air intake valve is displaced from the bottom dead point to the intake valve full closing timing, as expressed by $Z-a$, by the transversely sectional area of the cylinder (piston), as expressed by $B^2 \times \pi/4$, namely, by the following formula (4):

$$A = B^2 \times \pi/4 \times (Z-a) \qquad (4)$$

The amount of displacement of the piston, $a$, is determined by the following formula (5) as is well known to those skilled in the art:

$$\alpha = \frac{Z}{2}(1 - \cos y) + \frac{Z}{8l}(1 - \cos 2y) \qquad (5)$$

By reckoning this formula (5) in the formula (4), the formula (2) is given. Hence, the formula (3) means that the intake air flown back from the cylinder is prevented from reaching the surge tank 9a or 9b by making the volume ($= L \times S$) of the independent air intake passage 4a or 4b larger than the quantity of the flown-back air, A.

Further, it is to be noted that, in an engine low-speed region, the length from each upstream end of the surge tanks 9a and 9b to the inlet tank 75 for the intercooler sections 66 and 67 (the length of the upstream air intake passage 10a and the intercooler section 66 as well as the downstream air intake passage 10b and the intercooler section 67) is set to a relatively long length, thereby allowing the number of revolutions, R, which synchronizes to cause resonance, to exist in engine low-speed region (for example, 1,500 rpm to 2,500 rpm).

In FIG. 4, reference numerals 52 and 53 denote connection tubes connecting the intake manifolds 54 and 55 to the intake ports 50 and 51, respectively, which constitute the independent air intake passages 4a and 4b. Reference numeral 60 denotes a fuel distributing tube for supplying fuel to the injectors 16 and 16, and reference numeral 71 denotes a throttle body for accommodating the throttle valve 7.

With the aforementioned arrangement, although the geometric compression ratio is set to a high compression ratio as high as approximately 10 in this embodiment, the effective compression ratio may be lowered to approximately 7 due to the construction for the delay in the closing of the air intake valve, so that anti-knock performance can be improved even in a high-load, low-speed region in which knocking is generally likely to occur, thereby insuring an optimum spark timing and leading to improvements in both output and fuel economy.

Further, with the aforesaid arrangement, the resonance effect is allowed to occur in such a high-load, low-speed region, thereby achieving a further improvement in output. In other words, in a low-speed region, notwithstanding the delay in closing the intake valves 2a and 2b, the inflow of intake air immediately prior to the closing of the intake valves 2a and 2b is poorer than in a high-speed region, so that the temperature little arises due to a small adiabatic compression action within the combustion chambers (cylinders) 40 and 41. Hence, the pressure in the air intake passage on the exhaust side of the supercharger 5,—more specifically, the pressure within the downstream common passage 11 and the air intake passage located on the downstream side thereof—is caused to be lowered, thereby reducing the loss of driving power for the supercharger 5 and improving output by bettering the volume efficiency of the supercharger 5.

In a low-load or medium-load region, the bypass passage 8 is opened and the intake valve is delayed in closing, so that the loss in pumping can be reduced and mileage can be improved.

On the other hand, in a high-load, high rotational-speed region, that the independent air intake passages 4a and 4b do not cause inertia and that the upstream intake passages 10a and 10b and so on do not cause resonance does not result in the adiabatic compression within the combustion chambers 40 and 41, thereby maintaining the anti-knock performance to a high level and consequently insuring the optimum spark timing. This arrangement can also improve high output and fuel economy, while insuring reliability.

It is further to be noted that the independent air intake passages 4a and 4b are set to a relatively short length in this embodiment according to the present invention, so that when this invention is applied to the V-shaped engine as in this embodiment, the spatial volume to be occupied by the independent air intake passages 4a and 4b so disposed as to lie between the V-shaped space between the left-hand and right-hand banks of the cylinder block can be reduced, thereby providing the V-shaped space for the supercharger 5 and consequently miniaturizing the engine as a whole.

It is further to be noted that in this embodiment, the air intake valve closing timing is expressed in 60 degrees when the air intake valve is closed to the valve lift of 1 mm, however, it is also possible to delay the intake valve closing timing further. More specifically, the intake valve closing timing may be set to between 50 degrees and 90 degrees after the bottom dead point at the valve lift of 1 mm. If the intake valve closing timing would become 90 degrees or greater, start-up performance may be worsened. Further, it can be noted that the passage length of the independent air intake passage so disposed as to satisfy the air intake valve closing timing at 50 degrees to 90 degrees after the bottom dead point be preferably set to between approximately 110 mm to 300 mm with the back flow of intake air taken into account.

Further, a variable valve timing mechanism may be provided so as to vary the air intake valve between 50 degrees and 90 degrees. More specifically, as shown in FIG. 1, the variable valve timing mechanism VBT of a per se known construction may be interposed between the cam shaft for the air intake valve and the crank shaft, thereby altering and controlling the intake valve closing timing by a control unit U in response to output from a sensor S1 for sensing the number of revolutions of the engine. In this case, the higher the number of revolutions of the engine, the more the air intake valve closing timing becomes delayed between the range from 50 degrees to 90 degrees after the bottom dead point. It is also to be noted as a matter of course that this variable valve timing mechanism VBT is so designed as to alter a rotational phase angle of the cam shaft for the air intake valve with respect to the crank angle.

It is to be understood that the foregoing text and drawings relate to embodiments of the invention given by way of examples but not limitation. Various other embodiments and variants are possible within the spirit and scope of the present invention.

What is claimed is:

1. An air intake system for a supercharged engine having an independent air intake passage an end of which is communicated independently and separately with a combustion chamber of each cylinder, comprising:
   a supercharger for supercharging intake air; and
   means for delaying an air intake valve closing timing after a bottom dead point; and
   wherein the independent air intake passage is shaped so that the number of revolutions which causes maximum inertia in said independent air intake passage by supercharging in a high-speed region is higher than the number of revolutions of the engine at which maximum horse power is generated.

2. An air intake system as claimed in claim 1, wherein said air intake valve closing timing is delayed by 50 degrees or greater as expressed by a crank angle after the bottom dead point, when said air intake valve closing timing is defined by closing said intake valve to a valve lift of 1 mm.

3. An air intake system as claimed in claim 2, wherein said engine has a geometric compression ratio of 8.5 or greater.

4. An air intake system as claimed in claim 3, wherein a length of said independent air intake passage is so set as to have a predetermined length.

5. An air intake system as claimed in claim 4, wherein an amount of air which flows back, A, during a period of time from the time when the intake valve is located at bottom dead point to the time when the intake valve fully closes an intake port satisfies the following formula:

$$L = A/S$$

where
   L is the length of said independent air intake passage; and
   S is a transverse cross sectional area of said independent air intake passage.

6. An air intake system as claimed in claim 5, wherein the amount of air which flows back, A, is determined by the following formula:

$$A = B^2 \times \pi/4 [Z - Z/2\{(1 - \cos y) + Z/8l(1 - \cos 2y)\}]$$

where
   B is a diameter of a cylinder bore;
   Z is a piston stroke;
   l is a length of a connecting rod; and
   Y is a crank angle from the intake valve full closing timing to the top dead point 7. An air intake system as claimed in claim 3, wherein the number of revolutions, Ne, which synchronizes so as to cause inertia by supercharging, is determined by the following formula:

$$Ne = \frac{60}{1.5} \times \frac{a}{2\pi} \sqrt{\frac{S}{V \times L}} \times \beta$$

where
   a is a sonic speed propagating in air;
   L is a length of the independent air intake passage;
   S is a transverse cross sectional area of the independent air intake passage;
   V is a stroke volume; and
   B is a correction efficient.

8. An air intake system as claimed in claim 3, wherein said supercharger is a supercharger driven mechanically by the engine.

9. An air intake system as claimed in claim 8, wherein said supercharger is constantly driven by the engine.

10. An air intake system as claimed in claim 9, wherein an air intake passage of the engine has a bypass passage bypassing said supercharger.

11. An air intake system as claimed in claim 10, wherein said bypass passage is connected to a bypass valve so disposed as to be adjusted in accordance with the magnitude of an engine load.

12. An air intake system as claimed in claim 3, wherein:
   an air intake passage of the engine is set to implement supercharging so as to cause resonance; and
   the number of revolutions for supercharging so as to cause resonance is so set as to lie in a low-speed region lower than the number of revolutions of the engine at which the maximum horse power is generated.

13. An air intake system as claimed in claim 12, wherein:
   a plurality of cylinders are divided into a first cylinder group and a second cylinder group, each group consisting of the cylinders which are not adjacent to each other in terms of steps for air intake;
   an air intake passage of the engine is provided with one common volume enlarging portion as well as a first volume enlarging portion and a second volume enlarging portion;
   said first cylinder group is communicated with said first volume enlarging portion through said independent air intake passage;
   said second cylinder group is communicated with said second volume enlarging portion through said independent air intake passage;
   said first volume enlarging portion is communicated with said common volume enlarging portion through a first resonance passage; and
   said second volume enlarging portion is communicated with said common volume enlarging portion through a second resonance passage.

14. An air intake system as claimed in claim 13, wherein:

said air intake passage of the engine is connected to an intercooler for cooling intake air supercharged by said supercharger; and a space within said intercooler functions as said common volume enlarging portion.

15. An air intake system as claimed in claim 13, wherein:

said supercharger is a supercharger which is constantly driven mechanically by the engine;

a bypass passage is as disposed as to bypass said supercharger and said intercooler and as to supply intake air to both said first volume enlarging portion and said second volume enlarging portion; and a bypass valve so disposed as to be adjusted in accordance with the magnitude of the engine load is connected to said bypass passage.

16. An air intake system as claimed in claim 15, wherein:

said bypass passage comprises a common passage communicated with an air intake passage on the upstream side of said supercharger as well as a first branch passage branched from said common passage and communicated with said first volume enlarging portion and a second branch passage branched from said common passage and communicated with said second volume enlarging portion; and said bypass valve is connected to said common passage.

17. An air intake system as claimed in claim 3, wherein:

the engine is a V-shaped engine in which a left-hand cylinder bank and a right-hand cylinder bank are so arranged as to be a V-shaped form; and said supercharger is a supercharger to be driven mechanically by the engine and is disposed in a space so formed centrally between said left-hand cylinder bank and said right-hand cylinder bank.

18. An air intake system as claimed in claim 13, wherein:

the engine is a V-shaped engine in which a left-hand cylinder bank and a right-hand cylinder bank are so arranged as to be of a V-shaped form; and the cylinder group disposed in the left-hand cylinder bank comprises a first cylinder group and the cylinder group disposed in the right-hand cylinder bank comprises a second cylinder group.

19. An air intake system as claimed in claim 3, wherein the intake valve closing timing is so set as to be delayed by less than 90 degrees, as expressed by a crank angle after bottom dead point, when the intake valve closing timing is defined by closing the intake valve to the valve lift of 1 mm.

20. An air intake system as claimed in claim 3, further comprising a variable valve timing mechanism for altering the intake valve closing timing;

wherein the intake valve closing timing is delayed when the number of revolutions of the engine is higher than when it is lower, by controlling said variable valve timing mechanism.

* * * * *